(12) United States Patent
Kobayashi

(10) Patent No.: US 7,227,739 B2
(45) Date of Patent: Jun. 5, 2007

(54) SOLID ELECTROLYTIC CAPACITOR

(75) Inventor: Masaaki Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/943,988

(22) Filed: Sep. 20, 2004

(65) Prior Publication Data
US 2005/0105250 A1    May 19, 2005

(30) Foreign Application Priority Data
Sep. 26, 2003  (JP)  ............................ P2003-335936
Sep. 26, 2003  (JP)  ............................ P2003-335946

(51) Int. Cl.
*H01G 9/00* (2006.01)

(52) U.S. Cl. .............. 361/523; 361/525; 361/528; 361/529; 361/534; 29/25.03

(58) Field of Classification Search ........ 361/523–525, 361/528–534, 508, 516–519, 520, 502–504; 29/25.03, 25.01
See application file for complete search history.

(56) References Cited

U.S. PATENT DOCUMENTS

| | | | |
|---|---|---|---|
| 4,090,231 A * | 5/1978 | Millard et al. ............... | 361/529 |
| 4,603,467 A * | 8/1986 | Kaneko ....................... | 29/25.03 |
| 4,831,494 A | 5/1989 | Arnold et al. | |
| 5,880,925 A | 3/1999 | DuPre et al. | |
| 6,262,877 B1 | 7/2001 | Mosley | |
| 6,346,127 B1 * | 2/2002 | Kuriyama ................... | 29/25.03 |
| 6,466,430 B2 | 10/2002 | Mido et al. | |
| 6,606,237 B1 | 8/2003 | Naito et al. | |
| 6,625,009 B2 * | 9/2003 | Maeda ........................ | 361/528 |
| 6,661,645 B1 * | 12/2003 | Sakai et al. .................. | 361/523 |
| 6,751,086 B2 * | 6/2004 | Matsumoto .................. | 361/523 |
| 6,808,541 B2 * | 10/2004 | Maeda ........................ | 29/25.03 |
| 6,862,169 B2 * | 3/2005 | Kuroyanagi ................. | 361/523 |
| 6,891,717 B2 * | 5/2005 | Fujii et al. .................. | 29/25.03 |

* cited by examiner

*Primary Examiner*—Nguyen T. Ha
(74) *Attorney, Agent, or Firm*—Oliff & Berridge, PLC

(57) ABSTRACT

A solid electrolytic capacitor having significantly lowered its ESL is provided. In solid electrolytic capacitor elements adjacent each other in the solid electrolytic capacitor in accordance with the present invention, their respective anodes are connected to each other by an anode conduction path of a conduction path pair, whereas their respective cathodes are connected to each other by a cathode conduction path of the conduction path pair. Therefore, when electrons migrate between the solid electrolytic capacitor elements, respective currents directed opposite from each other flow through a pair of substantially parallel conduction paths. Consequently, a magnetic field caused by the current flowing through one conduction path is offset by a magnetic field caused by the current flowing through the other conduction path, whereby both magnetic fields cancel each other out. Hence, the solid electrolytic capacitor lowers its ESL.

8 Claims, 11 Drawing Sheets

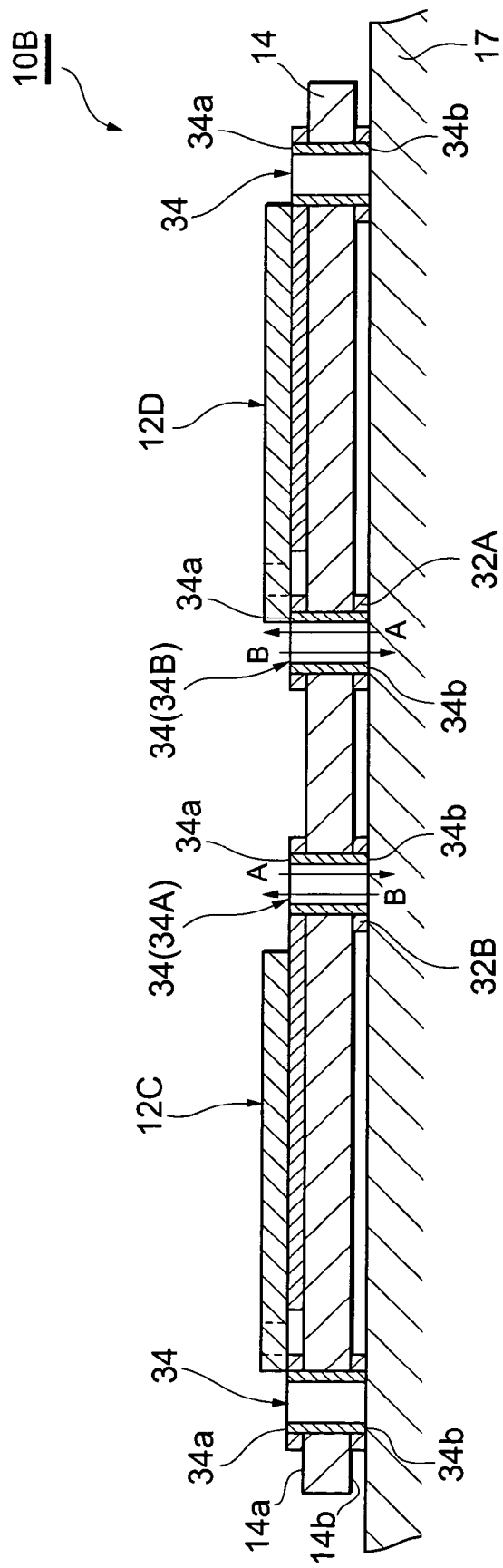

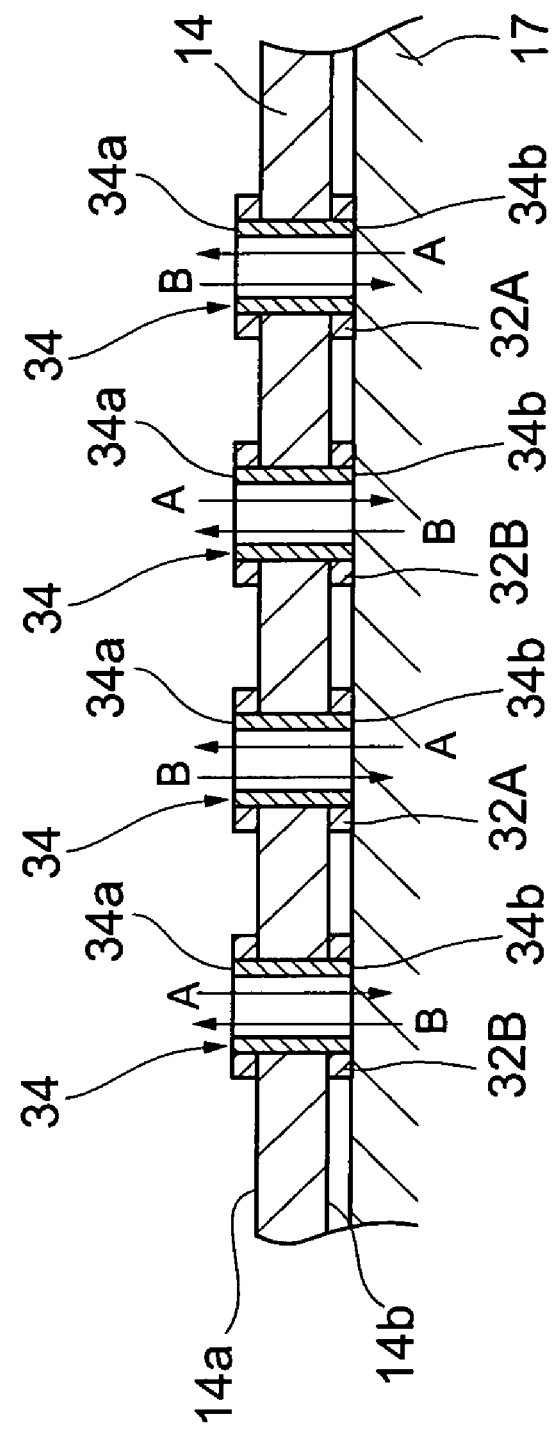

SOLID ELECTROLYTIC CAPACITOR

TECHNICAL FIELD

The present invention relates to a solid electrolytic capacitor.

BACKGROUND ART

For an anode of a capacitor element constituting a solid electrolytic capacitor, metals having an insulating oxide film forming capacitance, such as aluminum, titanium, niobium, zirconium, and tantalum, i.e., so-called valve metals, have conventionally been in use. The surface of such a valve metal is anode-oxidized, so as to form an insulating oxide film. Then, an solid electrolyte layer substantially functioning as a cathode is formed, and a conductive layer made of graphite, silver, or the like is provided as a cathode, whereby a capacitor element is obtained. A part of the capacitor element is constituted by a storage part in a rectangular thin strip form having a surface formed with the cathode, and a plurality of pairs of thin strip-like electrode parts projecting outward from a side face of a longer side of the storage part and functioning as an anode. A capacitor element having such a form is disclosed in U.S. Pat. No. 5,880,925, for example. The capacitor element in accordance with the above-mentioned publication is one employed for a laminate type ceramic capacitor.

The inventors conducted diligent studies concerning solid electrolytic capacitors such as the one mentioned above, and have found that lower ESL can be achieved when drawing out a plurality of anodes and cathodes of the capacitor element by branching (i.e. multitermination). Further, expecting that further multitermination can be attained by arranging a plurality of capacitor elements having such a form in a row, the inventors have newly found a technique which can significantly lower the ESL of the solid electrolytic capacitor.

That is to say, it is an object of the present invention to provide a solid electrolytic capacitor whose ESL is significantly lowered.

DISCLOSURE OF THE INVENTION

In one aspect, the present invention provides a solid electrolytic capacitor comprising a substrate; a plurality of solid electrolytic capacitor elements arranged in a row on the substrate; and a pair of conduction paths, substantially parallel to each other, comprising an anode conduction path for connecting respective anodes of the solid electrolytic capacitor elements adjacent each other and a cathode conduction path for connecting respective cathodes of the adjacent solid electrolytic capacitor elements.

In this solid electrolytic capacitor, the respective anodes of the adjacent solid electrolytic capacitor elements are connected to each other by the anode conduction path of the conduction path pair, whereas their respective cathodes are connected to each other by the cathode conduction path of the conduction path pair. Therefore, at he time of charging/discharging of the solid electrolytic capacitor elements, respective currents directed opposite from each other flow in a pair of conduction paths which are substantially parallel to each other. Therefore, a magnetic field caused by the current flowing through one conduction path is offset by a magnetic field caused by the current flowing through the other conduction path, whereby both magnetic fields cancel each other out. This lowers the ESL in the solid electrolytic capacitor.

Preferably, the anode conduction path and cathode conduction path extend in an aligning direction of the adjacent solid electrolytic capacitor elements. In this case, each conduction path connects the capacitor elements to each other by the shortest distance, and thus can significantly suppress the electric resistance in the conduction path.

Preferably, the conduction path pair is constituted by a lead pattern printed on one face of the substrate. When a substrate printed with a lead pattern is prepared beforehand in this case, the connection between the anode conduction path and each anode and the connection between the cathode conduction path and each cathode can easily be established only if the solid electrolytic capacitor elements are mounted on the substrate.

Preferably, the solid electrolytic capacitor further comprises a first terminal pair formed in the respective conduction paths of the conduction path pair, and a second terminal pair formed on the other face of the substrate so as to correspond to the first terminal pair, wherein the first and second terminal pairs are connected to each other by a through conduction path pair formed through the substrate in a thickness direction thereof. In this case, when the solid electrolytic capacitor operates, an anode terminal of a printed circuit board on which the solid electrolytic capacitor is mounted is connected to a second terminal connected to the anode conduction path in the second terminal pair, whereas a cathode terminal of the printed circuit board is connected to a second terminal connected to the cathode conduction path in the second terminal pair. Therefore, at the time of charging/discharging of the solid electrolytic capacitor, respective currents directed opposite from each other flow in a pair of through conduction paths interposed between the second terminal pair and first terminal pair. Therefore, a magnetic field caused by the current flowing through one through conduction path is offset by a magnetic field caused by the current flowing through the other through conduction path, whereby both magnetic fields cancel each other out. This lowers the ESL in the solid electrolytic capacitor. At the time of charging/discharging of the solid electrolytic capacitor, the current flowing through the anode conduction path of the conduction path pair and the current flowing through the cathode conduction path of the conduction path pair are directed opposite from each other. Therefore, the currents flowing opposite from each other in the surface direction of the substrate also lower the ESL in the solid electrolytic capacitor.

Preferably, the solid electrolytic capacitor element comprises a quadrangular storage part and respective anode electrode parts outwardly projecting from two sides of the storage part opposing each other, the anode electrode parts and the anode conduction path are electrically connected to each other, and the adjacent solid electrolytic capacitor elements are disposed on the substrate such that the respective anode electrode parts oppose each other.

In another aspect, the present invention provides a solid electrolytic capacitor comprising a substrate including a third terminal pair adjacent each other formed on one face, a fourth terminal pair, disposed on the other face, corresponding to the third terminal pair, and through conduction paths, formed through the substrate in a thickness direction thereof, connecting the third and fourth terminal pairs to each other; and first and second solid electrolytic capacitor elements arranged in a row on the one face of the substrate; wherein an anode of the first solid electrolytic capacitor element is connected to one terminal of the third terminal pair, whereas a cathode of the second solid electrolytic capacitor element is connected to the other terminal of the third terminal pair.

While the other face side of the substrate opposes the printed circuit board, the solid electrolytic capacitor is mounted on the printed circuit board, so that a predetermined pad pattern disposed on the substrate and the fourth terminal pair of the substrate are connected to each other. The through conduction path formed through the substrate in the thickness direction connects the fourth terminal pair to the third terminal pair formed on the one face of the substrate. One terminal of the third terminal pair is connected to the anode of the first solid electrolytic capacitor element on the one face of the substrate, whereas the other terminal of the third terminal pair is connected to the cathode of the second solid electrolytic capacitor element on the one face of the substrate. Therefore, at the time of charging/discharging of the capacitor elements in the solid electrolytic capacitor, respective currents directed opposite from each other flow through a pair of parallel through conduction paths, connected to the third terminal pair, extending in the thickness direction. As a consequence, magnetic fields caused by currents flowing through the through conduction paths cancel each other out, so that the ESL in the solid electrolytic capacitor is lowered, whereby impedance characteristics can greatly be improved in high-frequency regions.

Preferably, the one face of the substrate is further formed with a pair of fifth terminals adjacent each other, a cathode of the first solid electrolytic capacitor element is connected to one terminal of the fifth terminal pair, and an anode of the second solid electrolytic capacitor element is connected to the other terminal of the fifth terminal pair. In this case, respective currents directed opposite from each other flow through not only the through conduction paths corresponding to the third terminal pair connected to the anode of the first solid electrolytic capacitor element and the cathode of the second solid electrolytic capacitor element, but also the through conduction paths corresponding to the fifth terminal pair connected to the cathode of the first solid electrolytic capacitor element and the anode of the second solid electrolytic capacitor element, whereby ESL is further lowered in the solid electrolytic capacitor. Therefore, further multi-termination can be achieved while keeping an improvement in impedance characteristics in high-frequency regions.

Preferably, the third terminal pair is positioned between the first and second solid electrolytic capacitor elements. In this case, the first and second solid electrolytic capacitor elements adjacent each other approach each other, and the distance between the pair of third terminals is shortened, whereby the area of the substrate on which the capacitor elements are mounted can easily be reduced.

BRIEF DESCRIPTION OF THE DRAWINGS

FIG. 10 is a sectional view of the solid electrolytic capacitor taken along the line X—X of FIG. 8; and FIG. 11 is a sectional view of the solid electrolytic capacitor taken along the line XI—XI of FIG. 8.

BEST MODES FOR CARRYING OUT THE INVENTION

In the following, preferred embodiments of the solid electrolytic capacitor in accordance with the present invention will be explained with reference to the accompanying drawings. Constituents identical or equivalent to each other will be referred to with numerals identical to each other without repeating their overlapping descriptions.

First Embodiment

Figure 1:
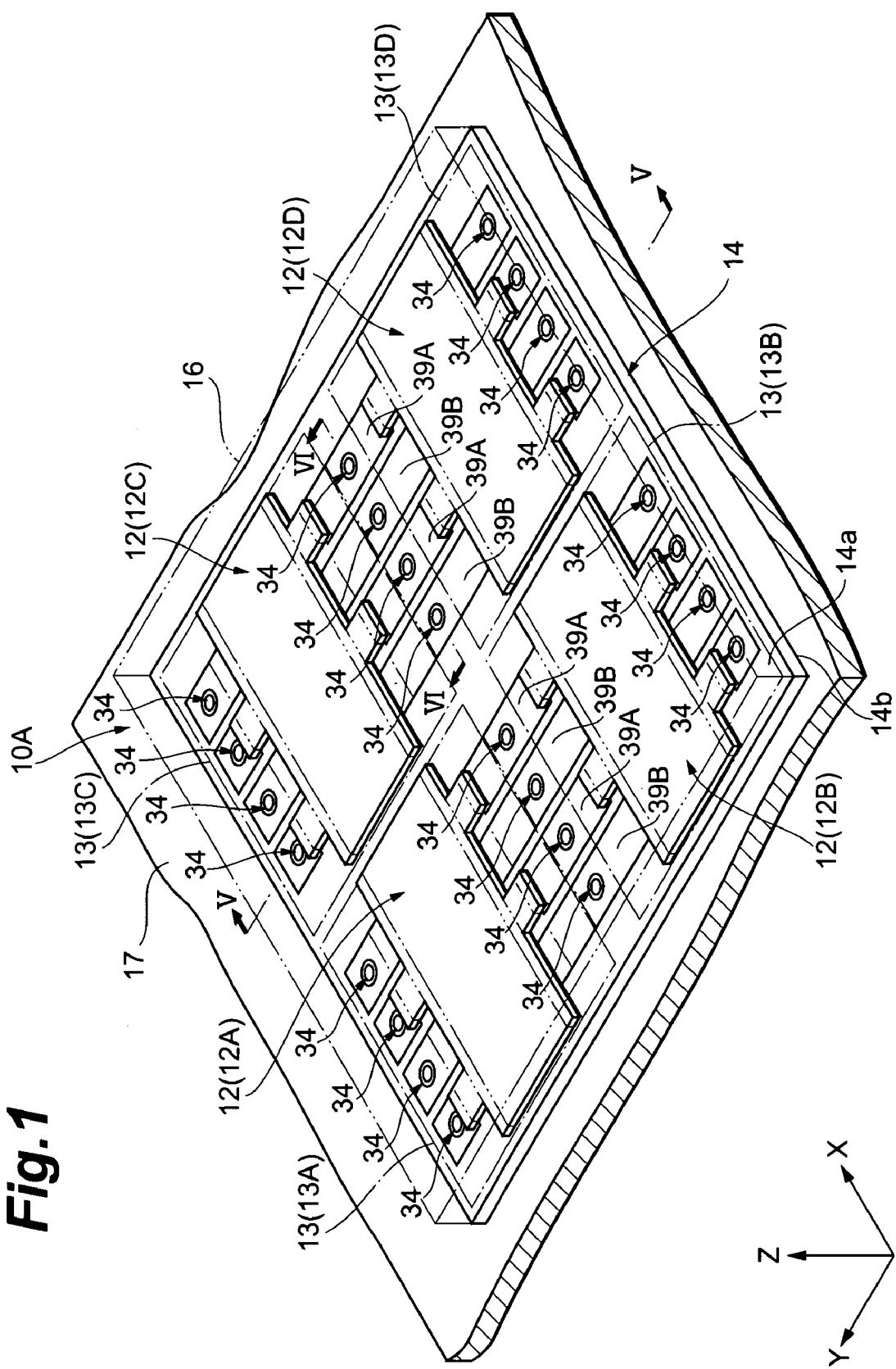
FIG. 1 is a schematic perspective view showing the solid electrolytic capacitor in accordance with a first embodiment of the present invention.

FIG. 1 is a schematic perspective view showing the solid electrolytic capacitor in accordance with a first embodiment of the present invention. As shown in FIG. 1, this solid electrolytic capacitor 10A comprises four solid electrolytic capacitor elements 12 (12A, 12B, 12C, 12D), a substrate 14 in a quadrangular thin strip form having an upper face 14a on which the four solid electrolytic capacitor elements 12 are mounted, and a resin mold 16 made of an epoxy resin for molding the four solid electrolytic capacitor elements 12 and the substrate 14. The four solid electrolytic capacitor elements (hereinafter simply referred to as "capacitor elements") 12 are mounted, respectively, on four element mounting regions 13 (13A, 13B, 13C, 13D) arranged in a matrix. The solid electrolytic capacitor 10A is a multiterminal type capacitor in which current paths at the time of charging/discharging are split into a number of paths, and is mounted on a printed circuit board 17 from the lower face 14b side of the substrate 14.

Each capacitor element 12 is one in which a cathode is formed in a partial region (a cathode forming region which will be explained later) on a foil-like aluminum support functioning as an anode having a surface 12a roughened (extended) and subjected to forming treatment. This cathode is constituted by a solid polymer electrolyte layer containing a conductive polymer compound, a graphite paste layer, and a silver paste layer.

Figure 2:
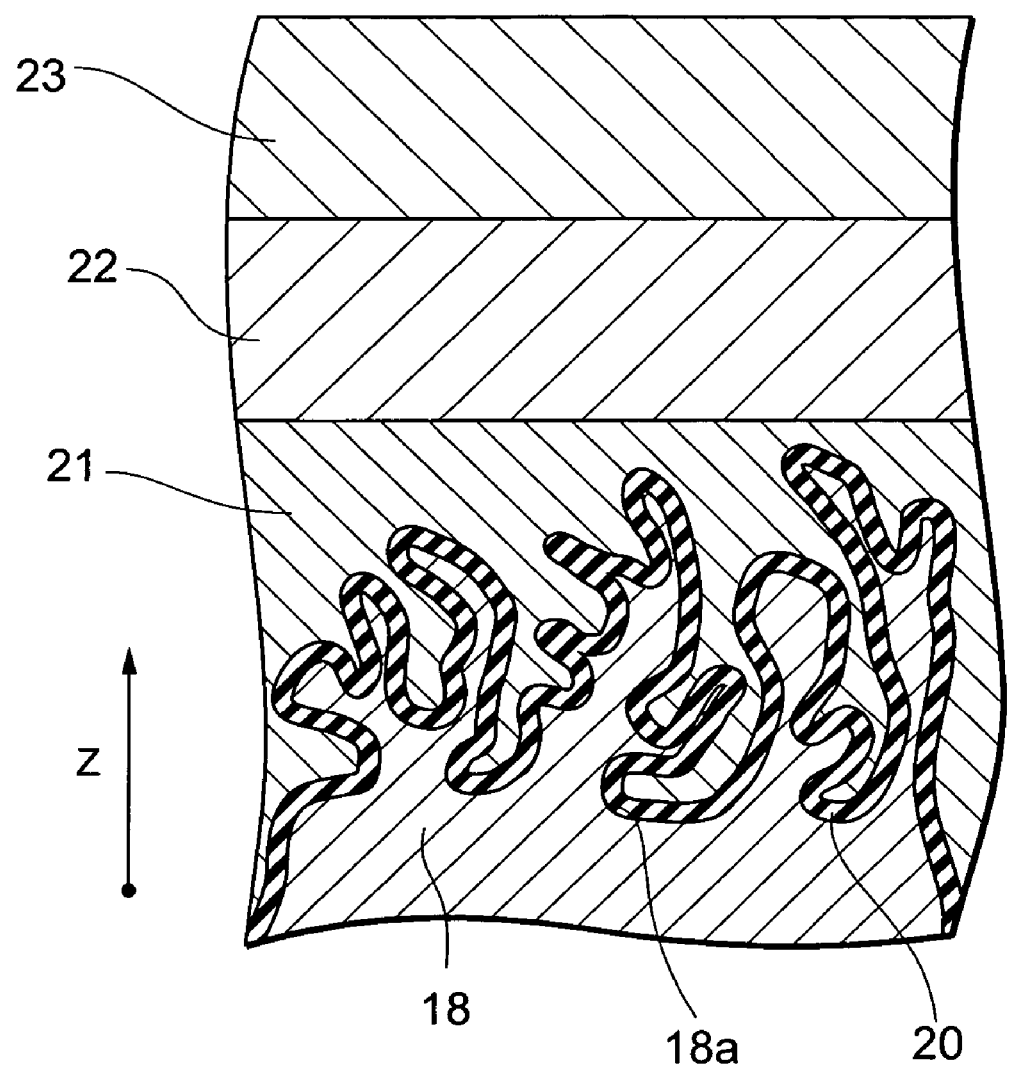
FIG. 2 is a schematic sectional view showing a major part of each capacitor element shown in FIG. 1.

With reference to FIG. 2, the surface structure of the capacitor elements 12 will be explained more specifically. FIG. 2 is a schematic sectional view showing a major part of each capacitor element 12 shown in FIG. 1. As shown in FIG. 2, an aluminum support 18 (having a thickness of 100 μm) roughened by etching has a surface 18a formed with an aluminum oxide film 20 upon forming treatment, i.e., anode oxidization. Etched pits of the aluminum support 18 formed by roughening are filled with a solid polymer electrolyte layer 21. The process below forms the solid polymer electrolyte layer 21. First, the liquid state monomer fills in the etched pits of the aluminum support 18, and then is subjected to chemical oxidative polymerization or electrolytic oxidative polymerization. A graphite paste layer 22 and a silver paste layer 23 are successively formed on the solid polymer electrolyte layer 21 by any method of screen printing, dipping, and spray coating. Therefore, the insulating aluminum oxide film 20 formed on the aluminum support 18 insulates the cathode (constituted by the solid polymer electrolyte layer, graphite paste layer, and silver paste layer) from the aluminum support 18 acting as an anode.

Figure 3:
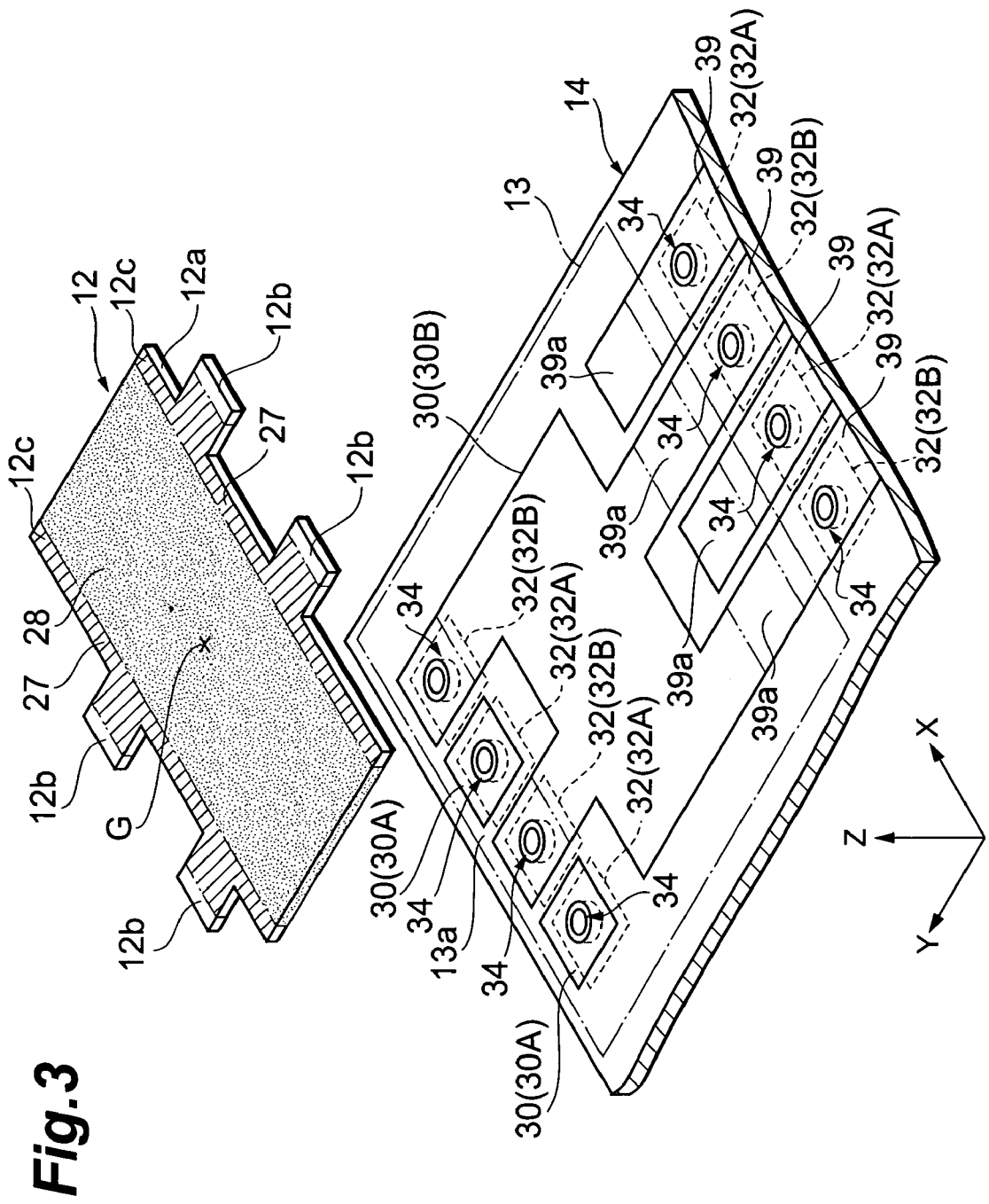
FIG. 3 is an exploded perspective view showing a major part of the solid electrolytic capacitor in FIG. 1.

As shown in FIGS. 1 and 3, each capacitor element 12 is constituted by a storage part 12a in a rectangular thin strip form and an even number of (e.g., two) pairs of anode electrode parts 12b, each formed like a thin strip, extending outward from side faces of the longer sides of the storage part 12a. FIG. 3 is an exploded perspective view showing a major part of the solid electrolytic capacitor in FIG. 1. In the following, for convenience of explanation, a direction along the longer sides of the storage part 12a of each capacitor element 12 will be referred to as X direction, a direction along the shorter sides of the storage part 12a of each capacitor element 12 will be referred to as Y direction, and a direction orthogonal to the X and Y directions will be referred to as Z direction.

In FIGS. 1 and 3, a cathode forming region 28 is formed over substantially all the areas of both faces and X-directional end faces of the storage part 12a. The above-mentioned solid polymer electrolyte layer 21, graphite paste layer 22, and silver paste layer 23 are successively laminated on the cathode forming region 28. One pair of anode electrodes 12b are formed in each of the longer side faces of the storage part 12a, whereas each of the anode electrode parts 12b extends in the Y direction. In the surface region of the storage part 12a, each edge region 12c provided with the anode electrode parts 12b is provided with an insulating resin layer 27 made of an epoxy resin or silicone resin. Because of the insulating resin 27, the cathode forming region 28 in the storage part 12a and the anode electrode parts 12b are more reliably insulated from each other.

The four anode electrode parts 12b are positioned symmetrically about a gravity point G of the storage part 12a. The gravity point G is defined as a point on the surface of the storage part 12a where diagonal lines of the storage part 12a intersect. When the anode electrode parts 12b have such a positional relationship, the polarity arrangement of the capacitor elements 12 is kept constant even when reversed and rotated by 180 degrees, whereby erroneous connections in terms of polarity can be prevented from occurring at the time of mounting on the substrate 14.

Each of the capacitor elements 12 having the form mentioned above is shaped by punching out an aluminum foil having a roughened surface formed with an aluminum oxide film. When the capacitor element 12 is dipped into a chemical liquid after the shaping, aluminum oxide films are formed at end faces thereof. A preferred example of the chemical liquid is an aqueous ammonium adipate solution having a concentration of 3%.

Figure 4:
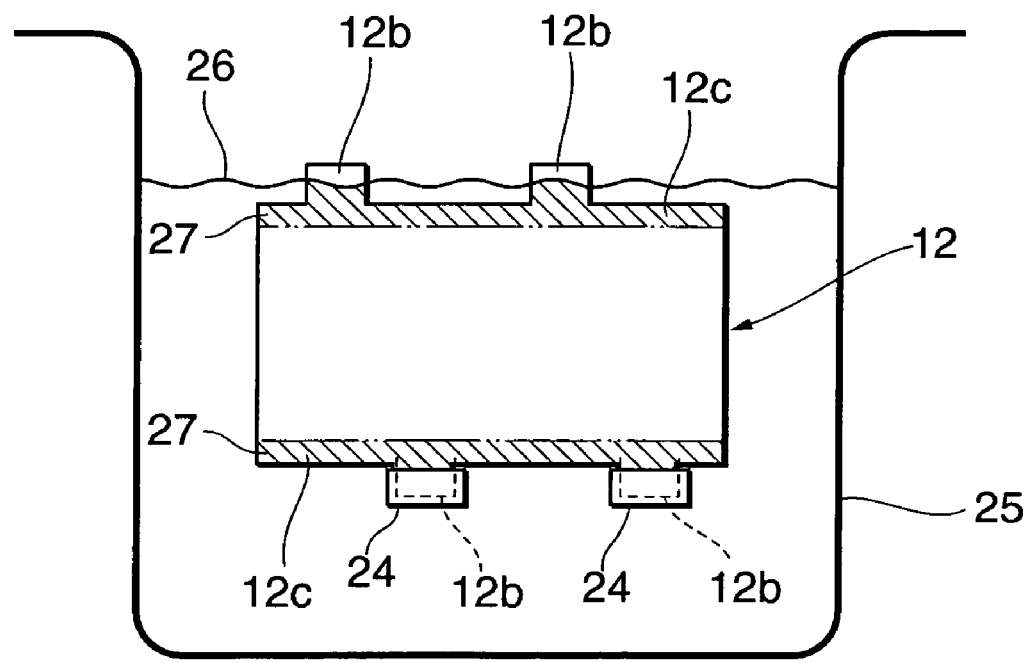
FIG. 4 is a view showing a state where a capacitor element is being anode-oxidized.

Various processes to which the capacitor element 12 is subjected will now be explained with reference to FIG. 4. FIG. 4 is a view showing a state where the capacitor element 12 is being subjected to anode oxidization. First, the surface region of the storage part 12a in the capacitor element 12, the edge regions 12c on the sides provided with the anode electrode parts 12b are formed with insulating resin layers 27. Forming the insulating resin layers 27 in the predetermined regions 12c as such reliably insulates a cathode and an anode, which will be formed in a later stage, from each other. Subsequently, the anode electrode parts 12b on one end part side of the capacitor element 12 are masked with a thermosetting resist 24. Then, while being supported by the anode electrode parts 12b on the other end side, the capacitor element 12 is dipped into a chemical solution 26 constituted by an aqueous ammonium adipate solution contained in a stainless beaker 25.

Then, a voltage is applied such that the supported anode electrode parts 12b and the stainless beaker 25 become positive and negative, respectively. The voltage at this time can appropriately be determined according to the thickness of the aluminum oxide film desired. When forming the aluminum oxide film having a thickness of 10 nm to 1 μm, a voltage of several to 200 V is usually applied. When the anode oxidization is started upon voltage application, the chemical solution 26 climbs up the roughened surface of the capacitor element 12 by a capillary action. Therefore, the aluminum oxide film 20 is formed on the whole surface of the capacitor element 12 whose surface including end faces is roughened. In thus produced capacitor element 12, a cathode is formed in the cathode forming region 28 by a known method. Finally, the resist 24 is removed, whereby the capacitor element 12 is completed.

Figure 5:
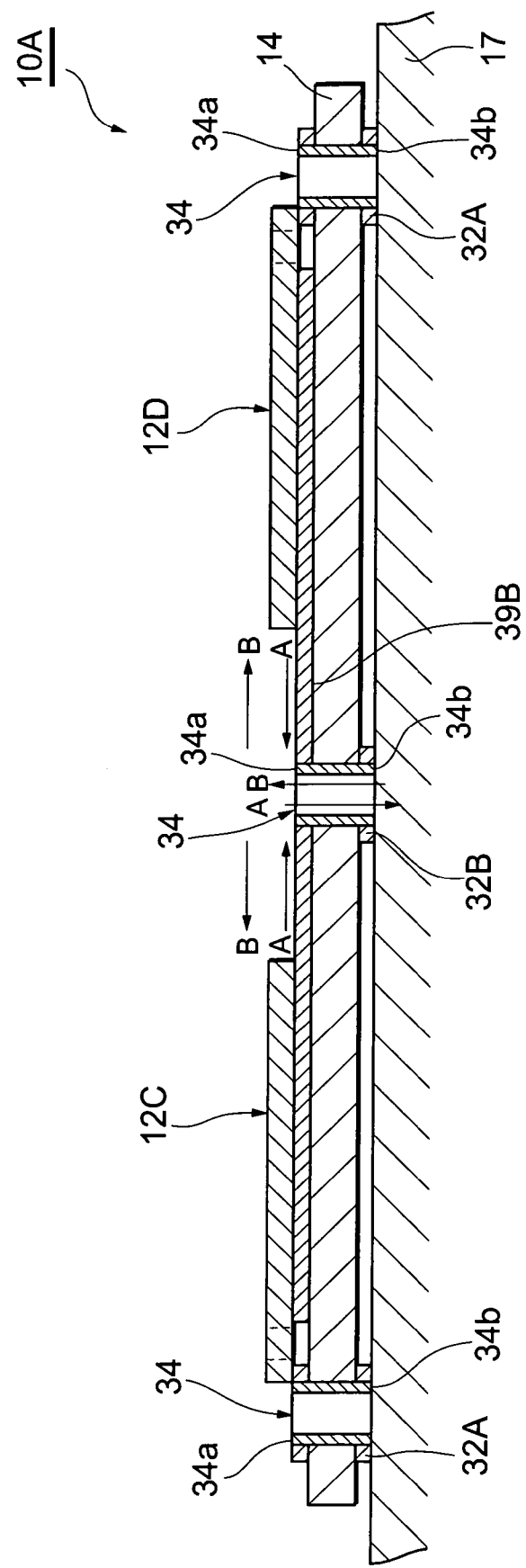
FIG. 5 is a sectional view of the solid electrolytic capacitor taken along the line V—V of FIG. 1.

Next, the state where the capacitor elements 12 are mounted on the substrate 14 will be explained with reference to FIGS. 3 and 5. FIG. 5 is a sectional view of the solid electrolytic capacitor taken along the line V—V of FIG. 1. The substrate 14 is a printed board made of an FR4 material (epoxy resin material) having an upper face 14a printed with copper lead patterns 30 and a lower face 14b printed with copper land electrodes 32, while having via holes 34 electrically connecting the copper lead patterns 30 to their corresponding land electrodes 32. Each via hole (through conduction path) 34 is constituted by a through hole 36, coated with copper plating 38, penetrating through the substrate 14 in the thickness direction thereof (Z direction in the drawing). In the edge part 13a closer to an end part of the substrate 14 among the edge parts of the element mounting region 13 having a square form, four via holes 34 align at equal intervals along the X direction. Four via holes 34 also align at equal intervals along the X direction on the side where the capacitor element 12 opposes its adjacent capacitor element 12. The via holes 34 arranged on this side are positioned in the middle of the space between the adjacent capacitor elements 12, and paired with their corresponding via holes 34 in the edge part 13a. Each pair of via holes 34 align in the Y direction. These via holes 34 are formed by drilling the through holes 36 in the substrate 14 and then coating the inner side face of each through hole 36 with electroless copper plating 38.

In the substrate lower face 14b, on the other hand, eight square land electrodes 32 are formed about portions where end parts 34b (second terminals) of the eight via holes 34 are exposed, whereas the land electrodes 32 are electrically connected to respective end parts 34b of their corresponding via holes 34. Each land electrode 32 is constituted by an anode land electrode 32A and a cathode land electrode 32B. One of the pair of land electrodes 32 connected to the pair of via holes 34 aligning in the Y direction is the anode land electrode 32A, whereas the other is the cathode land electrode 32B. In the four land electrodes 32 connected to the four via holes 34, respectively, aligning in the X direction in each of the positions in the edge part 13a of the element mounting region 13 in the substrate upper face 14a and in the middle of the space between the adjacent capacitor elements 12, the anode land electrodes 32A and cathode land electrodes 32B alternate with each other. In the following, for convenience of explanation, the via holes 34 connected to the cathode land electrodes 32B will be referred to as cathode via holes, whereas the via holes 34 connected to the anode land electrodes 32A will be referred to as anode via holes.

In the substrate upper face 14a, four element connecting lead patterns (conduction paths) 39 extending in the Y direction are formed about parts where end parts 34a (first terminals) of the four via holes 34 aligning in the X direction in the middle of the space between the adjacent capacitor elements 12 are exposed. In the first embodiment, as shown in FIG. 1, the capacitor elements 12A and 12B are arranged in a row, the capacitor elements 12C and 12D are arranged in a row, and the conduction paths 39 extend along the rows. In the following, for convenience of explanation, two conduction paths 39 corresponding to the anode via holes 34 connected to the anode land electrodes 32A will be referred to as anode conduction paths 39A, whereas two conduction paths 39 corresponding to the cathode via holes 34 connected to the cathode land electrodes 32B will be referred to as cathode conduction paths 39B. The conduction paths 39 are electrically connected to respective end parts 34a of their corresponding via holes 34, whereas end parts 39a of the conduction paths 39 extend to the inside of the element mounting region 13 for the capacitor element 12. In the substrate upper face 14a, lead patterns 30 are formed about parts where respective end parts of the four via holes 34 aligning in the X direction in the edge part 13a of the element mounting region 13 are exposed. These lead patterns 30 are constituted by anode lead patterns 30A connected to the anode land electrodes 32A by way of their corresponding via holes 34, and a cathode lead pattern 30B connected to the cathode land electrodes 32B by way of their corresponding via holes 34. The lead patterns 30A, 30B are electrically connected to the respective end parts 34a of their corresponding via holes 34.

The cathode lead pattern 30B is integrally formed such that surroundings of end parts of two via holes 34 connected to the cathode land electrodes 32B and the end parts 39a of the cathode conduction paths 39B are connected to each other, while including the center part of the element mounting region 13. On the other hand, the anode lead patterns 30A are respectively formed about the two via holes 34 connected to the anode land electrodes 32A and are each formed like a square as with the land electrode 32. Here, one cathode lead pattern 30B is electrically separated from four anode lead patterns 30A.

A method of making the solid electrolytic capacitor 10A by mounting the capacitor elements 12 on the substrate 14 will now be explained with reference to FIGS. 1 and 3.

When mounting the capacitor elements 12 onto the element mounting regions 13 of the substrate upper face 14a, the anode electrode parts 12b of the capacitor elements 12 are electrically connected to the anode lead patterns 30A and the end parts 39a of the anode conduction paths 39A disposed at their corresponding positions on the substrate 14. Here, the capacitor elements 12 adjacent each other are arranged such that their anode electrode parts 12b oppose each other. The electric connection is established by resistance welding or laser welding means such as a YAG laser spot metal welding, whereby the aluminum supports 18 (see FIG. 2) of the anode electrode parts 12b are electrically connected to the anode lead patterns 30A and anode conduction paths 39A. Consequently, the aluminum supports 18 and the anode land electrodes 32A formed on the substrate lower face 14b are electrically connected to each other by way of the four anode via holes 34.

When mounting the capacitor elements 12 onto the respective element mounting regions 13 of the substrate upper face 14a, the silver paste layer 23 (see FIG. 2) formed as the uppermost layer in the cathode forming region 28 of each capacitor element 12 is electrically connected to the cathode lead pattern 30B by a conductive adhesive (not depicted). Hence, the cathode (constituted by the solid electrolyte layer 21, graphite paste layer 22, and silver paste layer 23) formed in the cathode forming region 28 and the cathode land electrodes 32B formed in the substrate lower face 14b are electrically connected to each other by way of the four cathode via holes 34. After the capacitor elements 12 are mounted on the substrate 14 by the above-mentioned method, the resin mold 16 is formed by injection molding or transfer molding.

The polarity arrangement of the capacitor element 12A is the same as that of the capacitor element 12C, whereas the polarity arrangement of the capacitor element 12B is the same as that of the capacitor element 12D and is a mirror image of the polarity arrangement of the capacitor elements 12A and 12C about the line VI—VI shown in FIG. 1. Namely, when two capacitor elements adjacent each other are connected by the conduction path 39, their polarity arrangements are mirror images of each other about a virtual line orthogonal to the conduction path 39.

Figure 6:
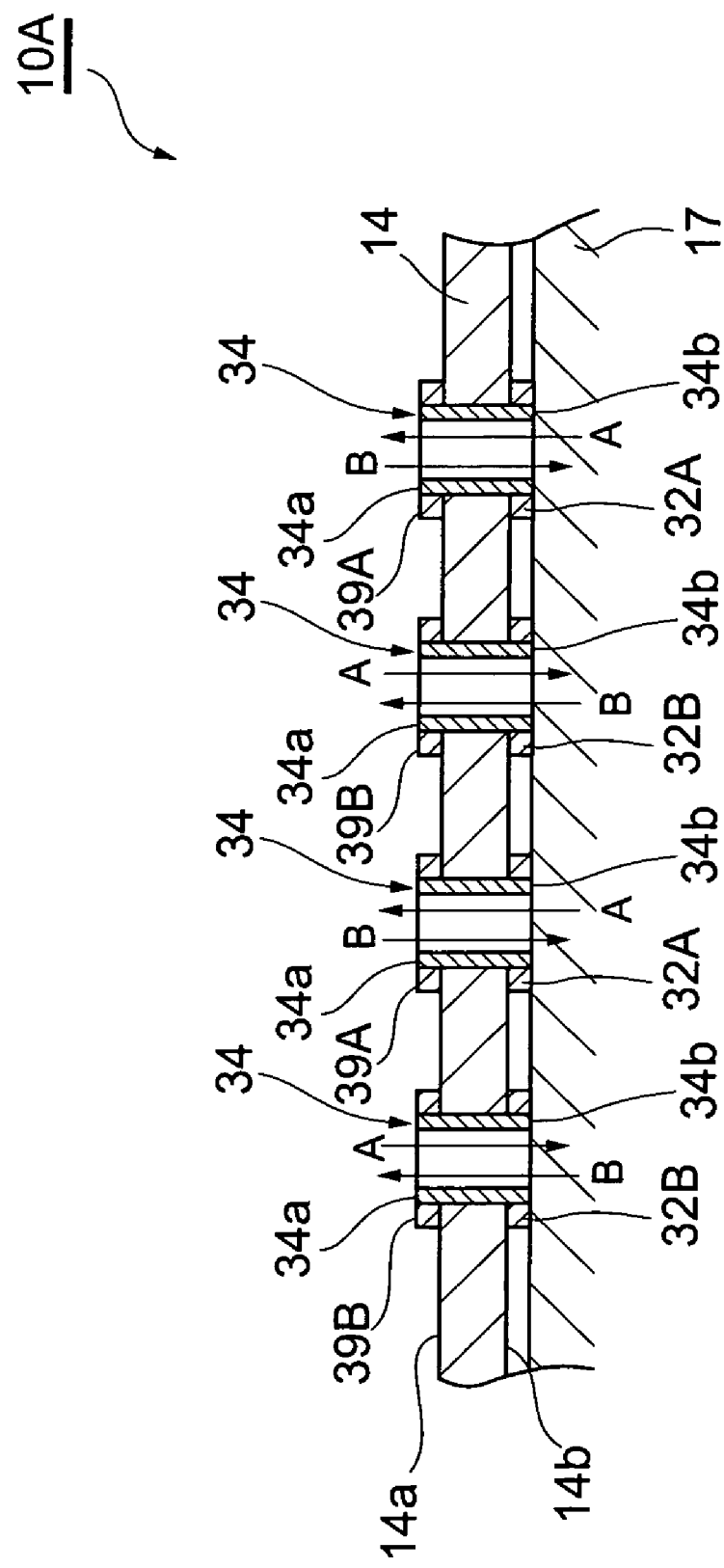
FIG. 6 is a sectional view of the solid electrolytic capacitor taken along the line VI—VI of FIG. 1.

As explained in detail in the foregoing, the anodes (aluminum supports 18) and cathode (constituted by the solid polymer electrolyte layer 21, graphite paste layer 22, and silver paste layer 23) of each capacitor element 12 are electrically connected to the land electrodes 32 on the substrate lower face 14b by way of the lead patterns 30, cathode conduction paths 39B, and via holes 34. As shown in FIG. 6, in the group of four via holes 34 aligning along the X direction in each of positions in the edge part 13a of the element mounting region 13 of the substrate upper face 14a and in the middle of the space between the neighboring capacitor elements 12, the anode via holes 34 and cathode via holes 34 alternate with each other. FIG. 6 is a sectional view of the solid electrolytic capacitor 10A taken along the line VI—VI of FIG. 1. In FIG. 6, arrow A shows the current flow at the time when the capacitor element 12 is in a charging state, whereas arrow B shows the current flow at the time when the capacitor element 12 is in a discharging state.

As can be seen from FIG. 6, when the capacitor element 12 operates, i.e., when the capacitor element 12 is charged or discharged, respective currents directed opposite from each other flow through the anode via hole 34 and cathode via hole 34 adjacent each other. Namely, when both of the capacitor elements 12C, 12D operate, a magnetic field due to the current flowing through the anode via hole 34 and a magnetic field due to the current flowing through the cathode via hole 34 occur and weaken each other. As a consequence, when the capacitor element 12 operates, the ESL due to the respective currents flowing through the neighboring via holes 34 is reduced.

In the element mounting regions 13, the respective capacitor elements 12 are mounted in the state mentioned above. Four element mounting regions 13 in a matrix of two in the X direction by two in the Y direction are densely arranged in the substrate upper face 14a. Since the four capacitor elements 12 are arranged, and six sets of four via holes 34 are disposed at the edge parts 13a of the element mounting regions 13 where the capacitor elements 12 are mounted, and at the positions in the middle of the space between the neighboring capacitor elements 12, the number of via holes 34 is greater than that in a solid electrolytic capacitor having only one capacitor element 12, whereby an increase in the number of terminals (multitermination) is realized in the solid electrolytic capacitor 10A.

Figure 7:
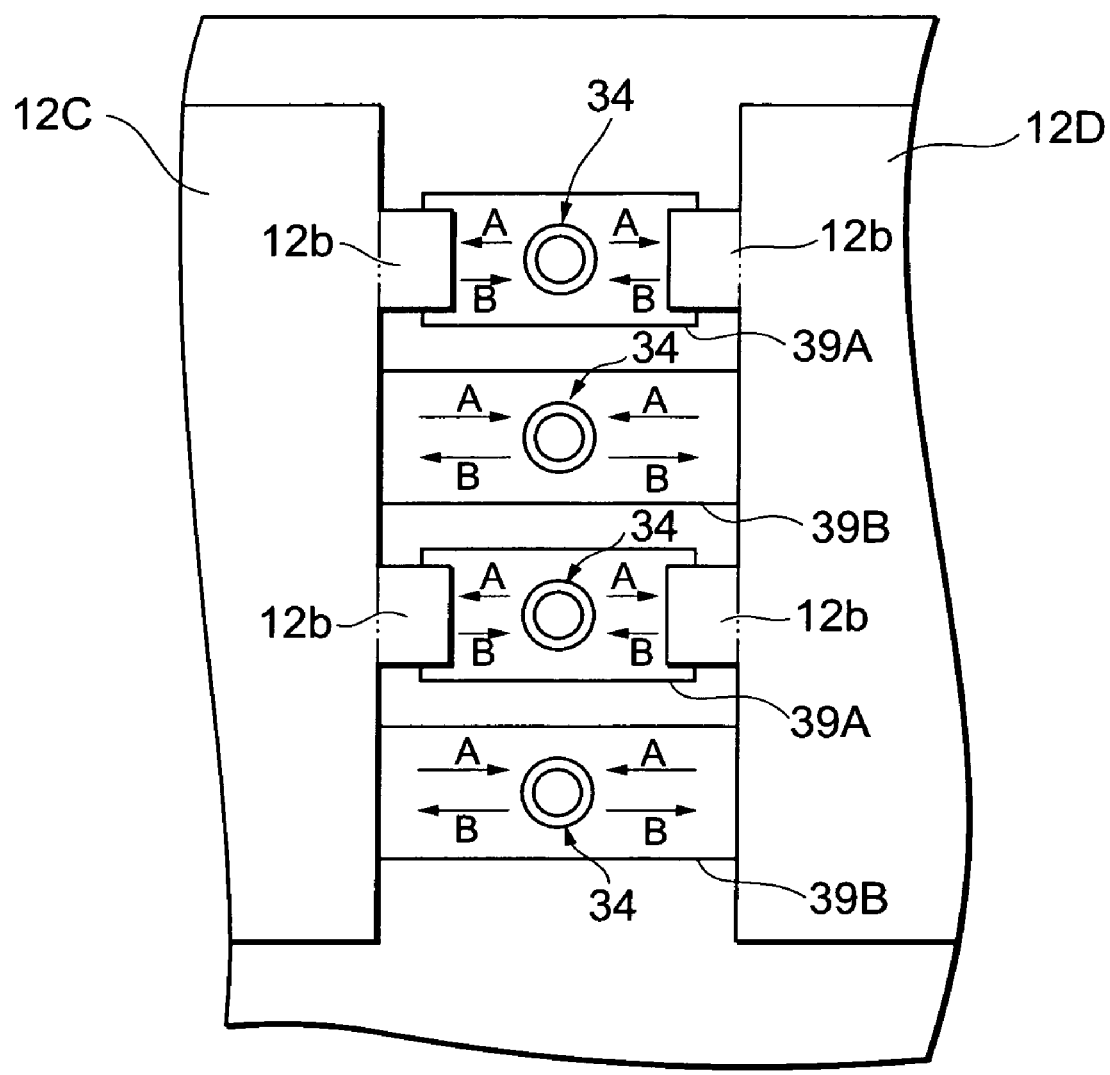
FIG. 7 is an enlarged plan view of a major part of the solid electrolytic capacitor shown in FIG. 1.

Operating states of the solid electrolytic capacitor 10A will now be explained with reference to FIGS. 5, 6, and 7. FIG. 7 is an enlarged plan view showing a major part of the solid electrolytic capacitor in FIG. 1. These drawings show the capacitor elements 12C and 12D, which are connected to electrodes (not depicted) on the printed circuit board 17 by way of the substrate 14. When the two capacitor elements 12C, 12D operate, currents indicated by arrow A (during charging) and arrow B (during discharging) flow through the via holes 34 between the capacitor elements 12C and 12D.

Namely, in the substrate upper face 14a shown in FIG. 7, respective currents directed opposite from each other flow through alternating two pairs of the anode conduction paths 39A and cathode conduction paths 39B at the time of charging/discharging. At the time of charging (see arrow A) by way of example, a current flows through each anode conduction path 39A toward the via hole 34, whereas a current flows through each cathode conduction path 39B away from the via hole 34. Consequently, at the time of charging/discharging, the magnetic field caused by the current flowing through the anode conduction path 39A and the magnetic field caused by the current flowing through the anode conduction path 39B cancel each other out, thereby lowering the ESL.

Also, respective currents directed opposite from each other flow through the alternating two pairs of cathode via holes 34 and anode via holes 34 at the time of charging/discharging in the cross section of the solid electrolytic capacitor 10A along the X direction shown in FIG. 6. Namely, at the time of charging (see arrow A) by way of example, a current flows down through each cathode via hole 34 toward the printed circuit board 17, whereas a current flows up through each anode via hole 34 away from the printed circuit board 17. Consequently, at the time of charging/discharging, the magnetic field caused by the current flowing through the anode via hole 39A and the magnetic field caused by the current flowing through the cathode via hole 39B cancel each other out, thereby lowering the ESL. Though the anode conduction paths 39A, cathode conduction paths 39B, and via holes 34 positioned between the capacitor elements 12C and 12D are explained in the foregoing, the anode conduction paths 39A, cathode conduction paths 39B, and via holes 34 positioned between the capacitor elements 12A and 12B arranged as with those mentioned above similarly contribute to lowering the ESL as a matter of course.

Namely, in the solid electrolytic capacitor 10A, a pair of conduction paths 39A, 39B constituted by the anode conduction paths 39A and cathode conduction paths 39B arranged in a row lower the ESL in the upper face 14a of the substrate 14. Also, in the solid electrolytic capacitor 10A, a via hole pair constituted by the anode via hole 34 and cathode via hole 34 arranged in a row along the X direction lowers the ESL in the thickness direction of the substrate 14. Therefore, the printed circuit board on which the solid electrolytic capacitor 10A is mounted conforms to high frequencies, and increases the current capacity while suppressing the amount of heat generation. Also, the solid electrolytic capacitor 10A can be employed in a circuit on the primary and secondary sides of a power supply, where a relatively large current flows.

When the substrate printed with the lead patterns 30 beforehand is prepared as mentioned above, simply mounting the capacitor elements 12 on the substrate 14 can easily connect the anode conduction paths 39A to the anodes, and the cathode conduction paths 39B to the cathodes.

Since a number of terminals are placed in one face 14b, the solid electrolytic capacitor 10A can greatly shorten the conduction paths when disposed directly under a semiconductor such as CPU and electrically connected thereto, whereby the decoupling effect can be improved.

Though the above-mentioned first embodiment shows a mode in which the via holes 34 are formed at positions where the conduction paths 39 are arranged, the via holes 34 may be omitted. In this case, for example, the capacitor elements 12C and 12D are connected in series. In this case, a predetermined input voltage (e.g., pulse input voltage) is applied to a set of via holes 34 aligning along the edge part 13a closer to an edge part of the substrate 14 among edge parts of the element mounting region 13, so that currents flow (electrons migrate) through the via holes 34 between the capacitor elements 12C, 12D, whereby respective currents directed opposite from each other flow through the anode conduction paths 39A and cathode conduction paths 39B, thus lowering the ESL as well.

Second Embodiment

Figure 8:
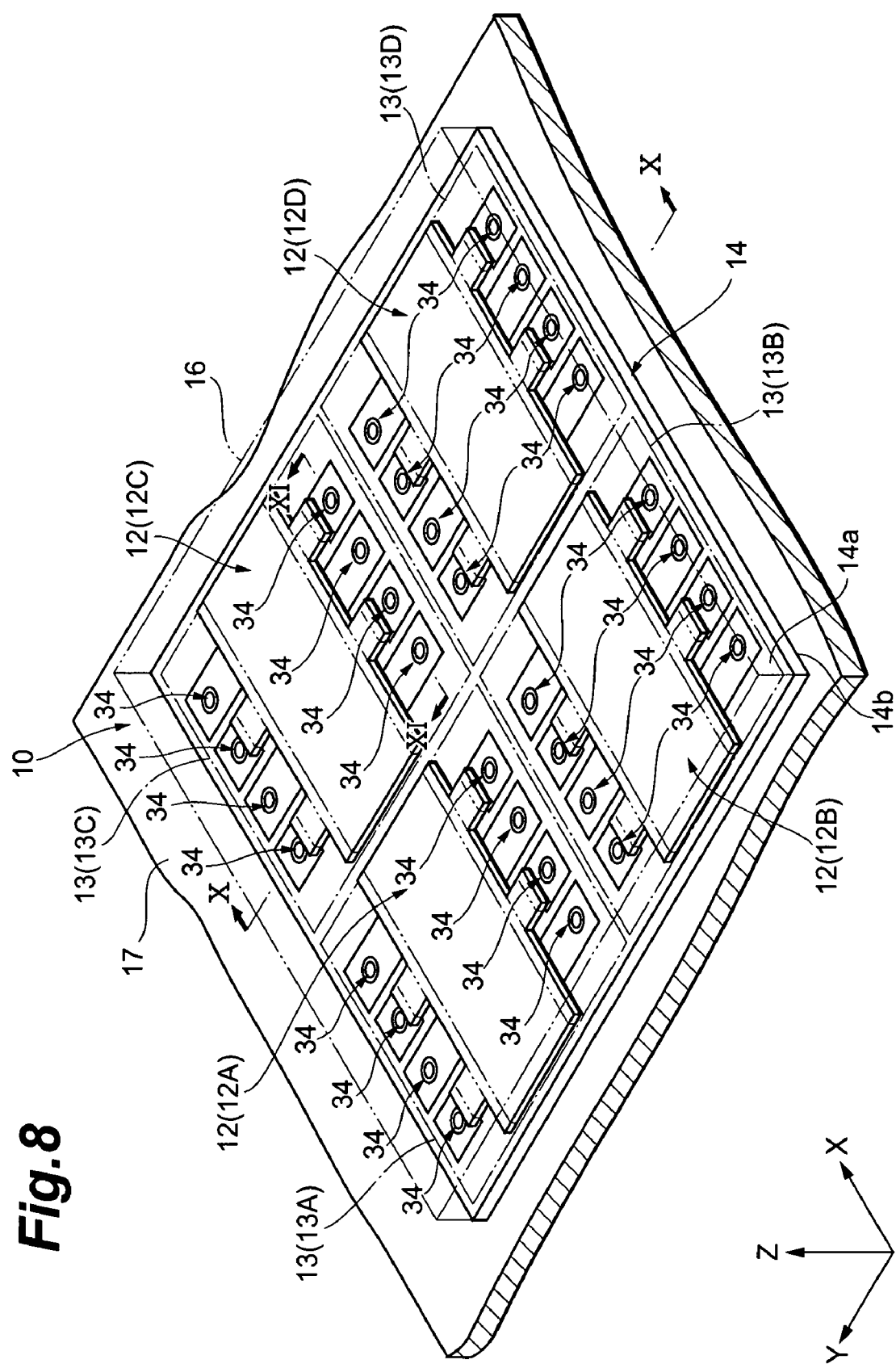
FIG. 8 is a schematic perspective view showing the solid electrolytic capacitor in accordance with a second embodiment of the present invention.
Figure 9:
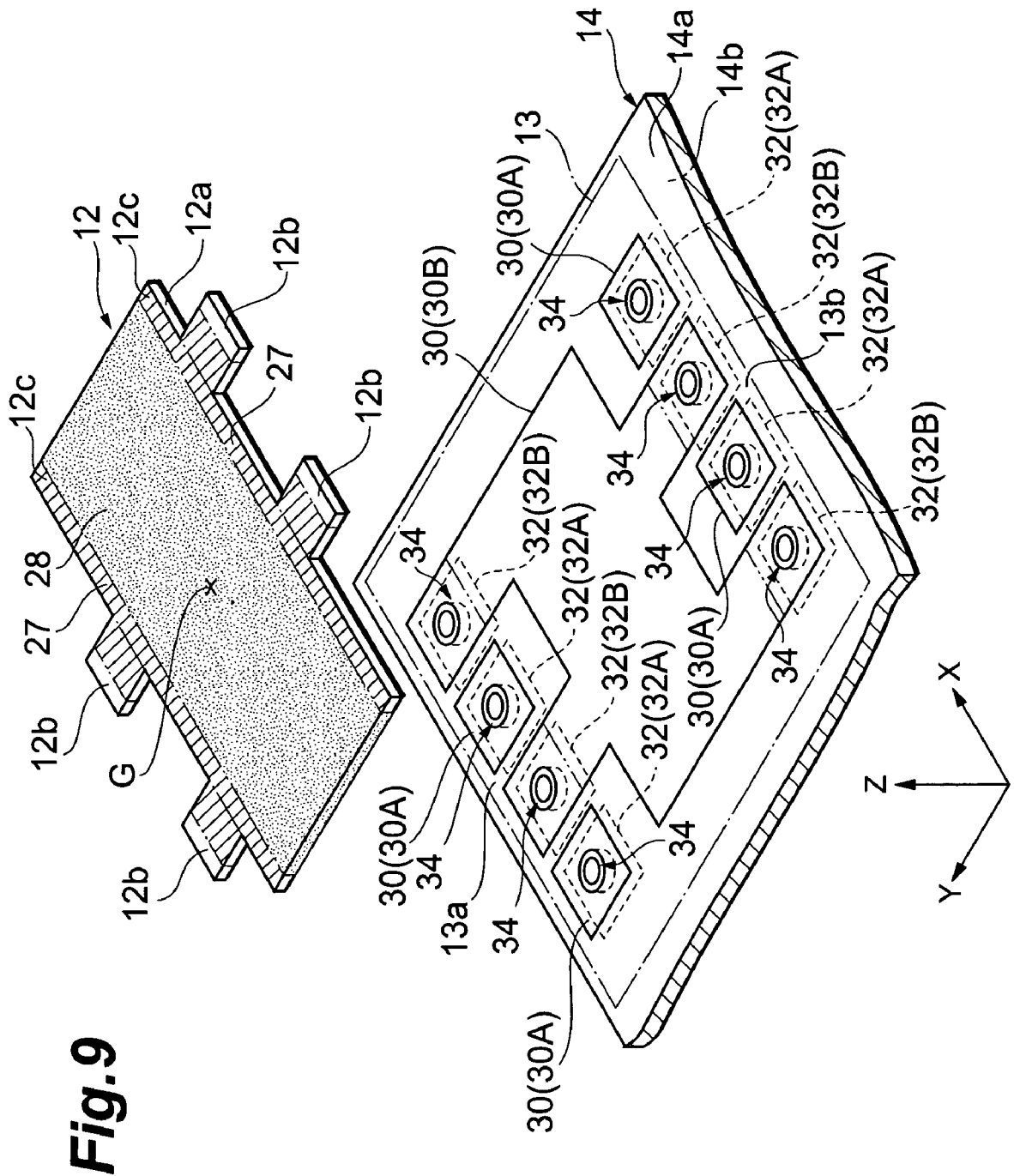
FIG. 9 is an exploded perspective view showing a major part of the solid electrolytic capacitor in FIG. 8.

FIG. 8 is a schematic perspective view showing the solid electrolytic capacitor in accordance with a second embodiment of the present invention. FIG. 9 is an exploded perspective view showing a major part of the solid electrolytic capacitor in FIG. 8. As shown in FIGS. 8 and 9, this solid electrolytic capacitor 10B comprises four capacitor elements 12 (12A, 12B, 12C, 12D), a substrate 14 having an upper face 14a on which the capacitor elements 12 are mounted, and a resin mold 16 for molding the four capacitor elements 12 and substrate 14 as with the solid electrolytic capacitor 10A in accordance with the first embodiment. The four capacitor elements 12 are respectively mounted in four element mounting regions 13 (13A, 13B, 13C, 13D) arranged in a matrix on the substrate upper face 14a. As with the solid electrolytic capacitor 10A, the solid electrolytic capacitor 10B is a multiterminal type capacitor in which current paths at the time of charging/discharging are divided into a number of paths, and is mounted on a printed circuit board 17 from the lower face 14b side of the substrate 14.

The state where the capacitor elements 12 are mounted on the substrate 14 in the solid electrolytic capacitor 10B will now be explained with reference to FIGS. 9 and 10. FIG. 10 is a sectional view of the solid electrolytic capacitor taken along the line X—X of FIG. 8. The substrate 14 is a printed board having an upper face 14a printed with lead patterns 30 and a lower face 14b printed with land electrodes 32, while having via holes 34 electrically connecting the copper lead patterns 30 to their corresponding land electrodes 32. Four via holes 34 also align at equal intervals in each of opposing edge parts 13a, 13b of a square element mounting region 13 along the edge parts 13a, 13b. The via holes 34 on one edge part 13a side are paired with the respective via holes 34 on the other edge part 13b side, while each pair of the via holes 34 align in the Y direction.

In the substrate lower face 14b, on the other hand, eight square land electrodes 32 are formed about portions where end parts (fourth terminals) 34b of the eight via holes 34 are exposed, whereas the land electrodes 32 are electrically connected to respective end parts 34b of their corresponding via holes 34. Each land electrode 32 is constituted by an anode land electrode 32A and a cathode land electrode 32B. One of the pair of land electrodes 32 connected to the pair of via holes 34 aligning in the Y direction is the anode land electrode 32A, whereas the other is the cathode land electrode 32B. In the four land electrodes 32 connected to the four via holes 34, respectively, aligning in the X direction in each of the edge parts 13a, 13b of the element mounting region 13 in the substrate upper face 14a, the anode land electrodes 32A and cathode land electrodes 32B alternate with each other.

In the substrate upper face 14a, lead patterns 30 are formed about parts where respective end parts (third and fifth terminals) 34a of the via holes 34 are exposed. These lead patterns 30 are constituted by anode lead patterns 30A and a cathode lead pattern 30B. The lead patterns 30A, 30B are electrically connected to the respective end parts 34a of their corresponding via holes 34. The cathode lead pattern 30B is integrally formed so as to include surroundings of end parts of the four cathode via holes 34 and the center part of the element mounting region 13. On the other hand, the anode lead patterns 30A are respectively formed about the four anode via holes 34 and are each formed like a square as with the land electrode 32. Here, one cathode lead pattern 30B is electrically separated from four anode lead patterns 30A.

A method of making the solid electrolytic capacitor 10B by mounting the capacitor elements 12 on the substrate 14 will now be explained with reference to FIGS. 8 and 9.

When mounting the capacitor elements 12 onto the element mounting regions 13 of the substrate upper face 14a, the anode electrode parts 12b of the capacitor elements 12 are electrically connected to the anode lead patterns 30A disposed at their corresponding positions on the substrate 14. The electric connection is established by resistance welding or metal welding means such as a YAG laser spot, whereby the aluminum supports 18 (see FIG. 2) of the anode electrode parts 12b are electrically connected to the anode lead patterns 30A. Consequently, the aluminum supports 18 and the four anode land electrodes 32A formed on the substrate lower face 14b are electrically connected to each other by way of the four anode via holes 34.

When mounting the capacitor elements 12 onto the respective element mounting regions 13 of the substrate upper face 14a, the silver paste layer 23 (see FIG. 2) formed as the uppermost layer in the cathode forming region 28 of each capacitor element 12 is electrically connected to the cathode lead pattern 30B by a conductive adhesive (not depicted). Hence, the cathode (constituted by the solid electrolyte layer 21, graphite paste layer 22, and silver paste layer 23) formed in the cathode forming region 28 and the four cathode land electrodes 32B formed in the substrate lower face 14b are electrically connected to each other by way of the four cathode via holes 34. After the capacitor elements 12 are mounted on the substrate 14 by the above-mentioned method, the resin mold 16 is formed by injection molding or transfer molding.

As explained in detail in the foregoing, the anodes (aluminum supports 18) and cathode (constituted by the solid polymer electrolyte layer 21, graphite paste layer 22, and silver paste layer 23) of each capacitor element 12 are electrically connected to the land electrodes 32 on the substrate lower face 14b by way of the lead patterns 30 and via holes 34. As shown in FIG. 11, in the group of four via holes 34 aligning along the X direction in each of the edge parts 13a, 13b of the element mounting region 13, the anode via holes 34 and cathode via holes 34 alternate with each other. FIG. 11 is a sectional view of the solid electrolytic capacitor 10B taken along the line XI—XI of FIG. 8. In FIG. 11, arrow A shows the current flow at the time when the capacitor element 12 is in a charging state, whereas arrow B shows the current flow at the time when the capacitor element 12 is in a discharging state. As can be seen from FIG. 11, when the capacitor element 12 operates, i.e., when the capacitor element 12 is charged or discharged, respective currents directed opposite from each other flow through the anode via hole 34 and cathode via hole 34 adjacent each other. Namely, when the capacitor element 12 operates, a magnetic field due to the current flowing through the anode via hole 34 and a magnetic field due to the current flowing through the cathode via hole 34 occur and weaken each other. As a consequence, when the capacitor element 12 operates, the ESL due to the respective currents flowing through the neighboring via holes 34 is reduced.

In the element mounting regions 13, the respective capacitor elements 12 are mounted in the state mentioned above. Four element mounting regions 13 in a matrix of two in the X direction by two in the Y direction are densely arranged in the substrate upper face 14a. Namely, in a part where the element mounting regions 13 are adjacent to each other, the four via holes 34 aligning at an edge of one element mounting region 13 and the four via holes 34 aligning at an edge of the other element mounting region 13 are disposed close to each other in the Y-axis direction. One via hole 34 in one element mounting region 13 and one via hole 34 in the other element mounting region 13 disposed close to each other along the Y axis have respective polarities different from each other, so as to become the anode via hole 34 and the cathode via hole 34, respectively. When the four capacitor elements 12 are arranged as such, a greater number of via holes 34 can be provided than in a solid electrolytic capacitor having only one capacitor element 12, whereby a significant increase in the number of terminals (multitermination) is realized.

This state will be explained with reference to FIG. 10. FIG. 10 shows the capacitor elements 12C and 12D, which are connected to electrodes (not depicted) on the printed circuit board 17 by way of the substrate 14. As can be seen from this drawing, the cathode via hole 34A of the capacitor element 12C on the capacitor element 12D side and the anode via hole 34B of the capacitor element 12D on the capacitor element 12C side extend in parallel along the Z-axis direction. The respective end parts 34a of the via holes 34A, 34B are disposed close to each other as with the via holes 34A, 34B, and construct a third terminal pair (fifth terminal pair).

When the two capacitor elements 12C, 12D operate in such a state, i.e., when both of the capacitor elements 12C, 12D are charged/discharged, respective currents directed opposite from each other flow through the anode via hole 34A and cathode via hole 34B as indicated by arrow A (during charging) and arrow B (during discharging) in the drawing. Therefore, when both of the capacitor elements 12C, 12D operate, a magnetic field due to the current flowing through the anode via hole 34 and a magnetic field due to the current flowing through the cathode via hole 34 occur and weaken each other. Namely, the via holes 34A, 34B align with each other, so that the generated magnetic fields cancel each other out, whereby the solid electrolytic capacitor 10B realizes a lower ESL. Because of the same reason as that mentioned above, a reduction in ESL is realized in any combination of the via holes 34 in the element mounting region 13 and the via holes 34 of its adjacent element mounting region 13 aligning in the Y direction. Namely, because of the same reason, a terminal pair (fourth terminal pair) positioned adjacent to the above-mentioned third terminal pair, whose currents at the time of charging/discharging are directed opposite from those of the third terminal pair contribute to lowering the ESL in the solid electrolytic capacitor 10B as well. Disposing the adjacent capacitor elements 12C, 12D close to each other while shortening the distance between the third pair of terminals 34a, 34a can easily reduce the area of the substrate 14 on which the capacitor elements 12 are mounted. This can also reduce the area of the mounting region of the printed circuit board 17 required for mounting the solid electrolytic capacitor 10B.

As explained in the foregoing, the end parts 34a of the via holes 34 acting as the third terminals and the end parts 34b of the via holes 34 acting as the fourth terminals are connected to each other by the via holes 34 penetrating through the substrate 14 in the thickness direction. In the two capacitor elements 12C, 12D adjacent each other, for example, the anode via hole 34A of the capacitor element 12C and the cathode via hole 34B of the capacitor element 12D are arranged in a row. Therefore, when the solid electrolytic capacitor 10B is charged/discharged, respective currents directed opposite from each other flow through a pair of parallel via holes 34A, 34B. Consequently, magnetic fields caused by the currents flowing through the via holes 34A, 34B cancel each other out, thereby lowering the ESL in the solid electrolytic capacitor 10B. Therefore, the solid electrolytic capacitor 10A conforms to high frequencies, and increases the current capacity while suppressing the amount of heat generation. Also, the solid electrolytic capacitor 10A can be employed in a circuit on the primary and secondary sides of a power supply, where a relatively large current flows.

In the adjacent element mounting regions 13C, 13D, there are four via hole pairs each comprising an anode via hole and a cathode via hole as with the above-mentioned pair of via holes 34A, 34B. In the whole solid electrolytic capacitor 10B, there are eight via hole pairs having the same relationship as with the via hole pairs 34A, 34B. At the time of charging/discharging, respective currents directed opposite from each other flow through each pair of via holes 34, 34 as in the above-mentioned pair of via holes 34A, 34B. Therefore, the ESL is significantly lowered in the solid electrolytic capacitor 10B. In each set of four via holes 34 aligning in the X direction along the longer sides of the storage part 12a of each capacitor element 12, the anode via holes 34 and cathode via holes 34 alternate with each other. Therefore, both the anode and cathode of the capacitor element 12 are connected to the four via hole pairs, whereby the ESL of the solid electrolytic capacitor 10B is effectively lowered at the time of charging/discharging.

Since a number of terminals are placed in one face 14b, the solid electrolytic capacitor 10B can greatly shorten the conduction paths when disposed directly under a semiconductor such as CPU and electrically connected thereto, whereby the decoupling effect can be improved.

Namely, when the number of terminals of the capacitor is increased in a limited capacitor mounting region on a printed circuit board, the terminals approach each other, whereby paths of currents flowing through the capacitor at the time of charging/discharging are densely arranged so as to come close to each other. When currents flow in the same direction through the current paths thus disposed close to each other, magnetic fields caused by these currents enhance each other, thereby increasing the ESL. This deteriorates the reduction of ESL advantageously realized by the multitermination, thus making it difficult for a circuit employing this solid electrolytic capacitor to conform to high frequencies. Therefore, the inventors conducted diligent studies and, as a result, have found the above-mentioned solid electrolytic capacitors 10A, 10B.

EXAMPLES

Example 1

In the following manner, a solid electrolytic capacitor in accordance with the first embodiment was made.

Making of Capacitor Element

First, from a roughened aluminum foil sheet having a thickness of 100 μm formed with an aluminum oxide film and adapted to yield an electrostatic capacity of 150 μF/cm$^2$, aluminum anode electrode bodies were formed in two kinds of forms of the capacitor element 12A (capacitor element 12C) and capacitor element 12B (capacitor element 12D) shown in FIG. 3 by punching. Each of the electrode bodies had an area of 0.6 cm$^2$.

Subsequently, while leaving only a region to become a cathode forming region, the roughened structure in the other region in the surface of each electrode body was collapsed by pressing. Then, predetermined regions (see numeral 12c in FIG. 3) were coated with a silicone resin by screen printing. Thereafter, in the anode electrode parts (see numeral 12b in FIG. 3), only the anode electrode parts on one side were coated with a UV-curable resist.

Thus obtained electrode body was set into an aqueous ammonium adipate solution adjusted to a pH of 6.0 with a concentration of 3 wt %, such that the roughened aluminum foil formed with the aluminum oxide film was completely immersed therein. At this time, the anode electrode parts coated with the resist were dipped in the aqueous ammonium adipate solution, whereas the uncoated anode electrode parts were partly dipped therein.

Subsequently, while the side of the anode electrode parts whose roughened structure was collapsed without resist-processing the electrode body was employed as an anode, the electrode body dipped in the aqueous solution was oxidized under a condition of a chemical forming current density of 50 to 100 mA/cm$^2$ and a chemical forming voltage of 12 V, whereby an aluminum oxide film was formed at cut end faces of the electrode body.

Thereafter, the electrode body was lifted up from the aqueous solution, and a solid polymer electrolyte layer made of polypyrrole was formed by chemical oxidative polymerization on the surface (cathode forming region) of the roughened aluminum foil. More specifically, an operation of setting only the roughened aluminum foil part formed with the aluminum oxide film into an ethanol/water mixed solution containing 0.1 mol/l of purified pyrrole monomer, 0.1 mol/l of sodium alkyl napthalenesulfonate, and 0.05 mol/l of iron sulfate (III) and stirring the mixture for 30 minutes to advance the chemical oxidative polymerization was repeated three times, so as to generate the solid polymer electrolyte layer. As a result, the solid polymer electrolyte layer having the maximum thickness of about 10 μm was formed.

Further, a carbon paste was applied to the surface of thus obtained solid polymer electrolyte layer, and a silver paste was applied to the surface of the carbon paste, so as to form a cathode electrode. After forming a paste layer made of the carbon paste and silver paste, the resist layer was dissolved in an organic solvent and eliminated, so as to expose the unroughened anode electrode parts. The foregoing processing produced the above-mentioned two kinds of four capacitor elements.

Making of Substrate

On the other hand, a glass-cloth-containing heat-resistant epoxy resin substrate (corresponding to the substrate 14 in FIG. 1) having a size of 12.0 mm×9.0 mm with a thickness of 0.2 mm, in which each face was formed with a Cu pattern and land electrodes having a thickness of 36 µm, was prepared as follows. For convenience of explanation, this glass-cloth-containing heat-resistant epoxy resin substrate will hereinafter be referred to as "FR4 substrate".

The FR4 substrate in which a copper foil having a thickness of 36 µm was laminated on each of the front and rear faces was processed into a size of 110 mm×90 mm. Subsequently, a resist corresponding to a pattern was formed on the copper foil on one face of the FR4 substrate. This pattern was a lead pattern (see the lead patterns 30 in FIG. 3), in which the above-mentioned two kinds of four capacitor elements were accommodated in a predetermined region (element group mounting region) of 12.0 mm×9.0 mm. On the FR4 substrate, 25 element group mounting regions were provided, and each was formed with the above-mentioned pattern. On the other face of the FR4 substrate, a resist film corresponding to a land electrode pattern (see the land electrodes 32 in FIG. 3) was formed without being misaligned with the above-mentioned lead pattern. Then, the copper foil was chemically etched by using a known method, so as to form a predetermined pattern.

Subsequently, the lead pattern on one face of the FR4 substrate and the land electrode pattern on the other face were electrically connected to each other by using 32 via holes (see numeral 34 in FIG. 3; each having a diameter of 0.2 mm) disposed at predetermined positions. Namely, 16 anode lead patterns (see the anode lead patterns 30A in FIG. 3) on one face of the FR4 substrate were connected to 16 anode land electrodes (see the anode land electrodes 32A in FIG. 3) on the other face were connected to each other by the via holes. Also, 4 cathode lead patterns (see the cathode lead patterns 30B in FIG. 3) on one face of the FR4 substrate and 16 cathode land electrodes (see the cathode land electrodes 32B in FIG. 3) were connected to each other by the via holes. When appropriate, via hole inner wall parts and copper foil pattern parts were coated with nickel (having a thickness of 3 µm) and gold (having a thickness of 0.08 µm) by electroless plating, so as to achieve more reliable conduction between the lead patterns and land electrode patterns.

Mounting of Capacitor Element onto Substrate

In each of the element group mounting regions formed with the above-mentioned patterns, four capacitor elements were mounted. Here, the four anode electrode parts of each capacitor element were overlaid on their corresponding anode lead patterns of the element group mounting region. The cathode forming regions in the capacitor elements opposing each other and their corresponding cathode lead patterns were bonded to each other with a silver type epoxy conductive adhesive, so that the capacitor elements and the cathode lead patterns were electrically connected to each other. Here, end parts of the anode electrode parts of each capacitor element and their corresponding anode lead patterns were welded to each other by a YAG laser spot welder made by NEC Corporation, so that the anode electrode parts of each capacitor element and their corresponding anode lead patterns were electrically connected to each other.

Exterior, Processing, and Evaluation

Thereafter, for sealing the capacitor elements on the FR4 substrate, an epoxy resin mold (see numeral 16 in FIG. 1) having a resin thickness of 1.0 mm was formed by vacuum printing. Subsequently, with the epoxy resin mold facing up, the substrate was cut into chips each having a size of 12.0 mm×9.0 mm. The chip was washed, whereby a discrete type solid electrolytic capacitor #1 such as the one shown in FIG. 1 was obtained. Thereafter, a predetermined voltage was applied to the solid electrolytic capacitor by a known method, so as to perform aging, thereby sufficiently lowering leak current.

Electric characteristics of thus obtained solid electrolytic capacitor #1 were evaluated. Specifically, the solid electrolytic capacitor #1 was secured to a predetermined evaluation substrate by soldering, and its electrostatic capacity and $S_{21}$ characteristic were measured by an impedance analyzer 4194A and a network analyzer 8753D which were manufactured by Agilent Technologies, Inc. According to thus obtained $S_{21}$ characteristic, an equivalent circuit simulation was carried out, so as to determine electrostatic capacity, ESR value, and ESL value. Thus obtained results are shown in Table 1 which will follow. Table 1 is a table showing characteristics of four electrochemical elements (#1-A, #1-B, #1-C, #1-D) incorporated in the solid electrolytic capacitor #1.

TABLE 1

| Capacitor element | Electrostatic capacity | ESR | ESL |
| --- | --- | --- | --- |
| #1-A | 82.0 µF | 17 mΩ | 110 pH |
| #1-B | 89.0 µF | 18 mΩ | 150 pH |
| #1-C | 78.0 µF | 21 mΩ | 135 pH |
| #1-D | 83.0 µF | 18 mΩ | 100 pH |

Example 2

In the following manner, a solid electrolytic capacitor in accordance with the second embodiment was produced.

Making of Capacitor Element

First, from a roughened aluminum foil sheet having a thickness of 100 µm formed with an aluminum oxide film and adapted to yield an electrostatic capacity of 150 µF/cm$^2$, an aluminum anode electrode body was formed in the same shape as with the capacitor element 12 shown in FIG. 9 by punching. The electrode body had an area of 0.6 cm$^2$.

Subsequently, while leaving only a region to become a cathode forming region, the roughened structure in the other region in the surface of each electrode body was collapsed by pressing. Then, predetermined regions (see numeral 12c in FIG. 9) were coated with a silicone resin by screen printing. Thereafter, in the anode electrode parts (see numeral 12b in FIG. 9), only the anode electrode parts on one side were coated with a UV-curable resist.

Thus obtained electrode body was set into an aqueous ammonium adipate solution adjusted to a pH of 6.0 with a concentration of 3 wt %, such that the roughened aluminum foil formed with the aluminum oxide film was completely immersed therein. At this time, the anode electrode parts coated with the resist were dipped in the aqueous ammonium adipate solution, whereas the uncoated anode electrode parts were partly dipped therein.

Subsequently, while the side of the anode electrode parts whose roughened structure was collapsed without resist-processing the electrode body was employed as an anode, the electrode body dipped in the aqueous solution was oxidized under a condition of a chemical forming density of 50 to 100 mA/cm$^2$ and a chemical forming voltage of 12 V, whereby an aluminum oxide film was formed at cut end faces of the electrode body.

Thereafter, the electrode body was lifted up from the aqueous solution, and a solid polymer electrolyte layer made of polypyrrole was formed by chemical oxidative polymerization on the surface (cathode forming region) of the roughened aluminum foil. More specifically, an operation of setting only the roughened aluminum foil part formed with the aluminum oxide film into an ethanol/water mixed solution containing 0.1 mol/l of purified pyrrole monomer, 0.1 mol/l of sodium alkyl napthalenesulfonate, and 0.05 mol/l of iron sulfate (III) and stirring the mixture for 30 minutes to advance the chemical oxidative polymerization was repeated three times, so as to generate the solid polymer electrolyte layer. As a result, the solid polymer electrolyte layer having the maximum thickness of about 10 μm was formed.

Further, a carbon paste was applied to the surface of thus obtained solid polymer electrolyte layer, and a silver paste was applied to the surface of the carbon paste, so as to form a cathode electrode. After forming a paste layer made of the carbon paste and silver paste, the resist layer was dissolved in an organic solvent and eliminated, so as to expose the unroughened anode electrode parts. The capacitor element was made by the foregoing processing. Four such capacitor elements were prepared by using the same manufacturing method.

Making of Substrate

On the other hand, a glass-cloth-containing heat-resistant epoxy resin substrate (corresponding to the substrate 14 in FIG. 8) having a size of 12.0 mm×9.0 mm with a thickness of 0.2 mm, in which each face was formed with a Cu pattern and land electrodes having a thickness of 36 μm, was prepared as follows. For convenience of explanation, this glass-cloth-containing heat-resistant epoxy resin substrate will hereinafter be referred to as "FR4 substrate".

The FR4 substrate in which a copper foil having a thickness of 36 μm was laminated on each of the front and rear faces was processed into a size of 110 mm×90 mm. Subsequently, a resist corresponding to a pattern was formed on the copper foil on one face of the FR4 substrate. This pattern was a lead pattern (see the lead patterns 30 in FIG. 9), in which the above-mentioned four capacitor elements were accommodated in a predetermined region (element group mounting region) of 12.0 mm×9.0 mm. On the FR4 substrate, 25 element group mounting regions were provided, and each was formed with the above-mentioned pattern. On the other face of the FR4 substrate, a resist film corresponding to a land electrode pattern (see the land electrodes 32 in FIG. 9) was formed without being misaligned with the above-mentioned lead pattern. Then, the copper foil was chemically etched by using a known method, so as to form a predetermined pattern.

Subsequently, the lead pattern on one face of the FR4 substrate and the land electrode pattern on the other face were electrically connected to each other by using 32 via holes (see numeral 34 in FIG. 9; each having a diameter of 0.2 mm) disposed at predetermined positions. Namely, 16 anode lead patterns (see the anode lead patterns 30A in FIG. 9) on one face of the FR4 substrate were connected to 16 anode land electrodes (see the anode land electrodes 32A in FIG. 9) on the other face were connected to each other by the via holes. Also, 4 cathode lead patterns (see the cathode lead patterns 30B in FIG. 9) on one face of the FR4 substrate and 16 cathode land electrodes (see the cathode land electrodes 32B in FIG. 9) were connected to each other by the via holes. When appropriate, via hole inner wall parts and copper foil pattern parts were coated with nickel (having a thickness of 3 μm) and gold (having a thickness of 0.08 μm) by electroless plating, so as to achieve more reliable conduction between the lead patterns and land electrode patterns.

Mounting of Capacitor Element onto Substrate

In each of the element group mounting region formed with the above-mentioned patterns, four capacitor elements were mounted. Here, the four anode electrode parts of each capacitor element were overlaid on their corresponding anode lead patterns of the element group mounting region. The cathode forming regions in the capacitor elements opposing each other and their corresponding cathode lead patterns were bonded to each other with a silver type epoxy conductive adhesive, so that the capacitor elements and the cathode lead patterns were electrically connected to each other. Here, end parts of the anode electrode parts of each capacitor element and their corresponding anode lead patterns were welded to each other by a YAG laser spot welder made by NEC Corporation, so that the anode electrode parts of each capacitor element and their corresponding anode lead patterns were electrically connected to each other.

Exterior, Processing, and Evaluation

Thereafter, for sealing the capacitor elements on the FR4 substrate, an epoxy resin mold (see numeral 16 in FIG. 8) having a resin thickness of 1.0 mm was formed by vacuum printing. Subsequently, with the epoxy resin mold facing up, the substrate was cut into chips each having a size of 12.0 mm×9.0 mm. The chip was washed, whereby a discrete type solid electrolytic capacitor #1 such as the one shown in FIG. 8 was obtained. Thereafter, a predetermined voltage was applied to the solid electrolytic capacitor by a known method, so as to perform aging, thereby sufficiently lowering leak current.

Electric characteristics of thus obtained solid electrolytic capacitor #1 were evaluated. Specifically, the solid electrolytic capacitor #1 was secured to a predetermined evaluation substrate by soldering, and its electrostatic capacity and $S_{21}$ characteristic were measured by an impedance analyzer 4194A and a network analyzer 8753D which were manufactured by Agilent Technologies, Inc. According to thus obtained $S_{21}$ characteristic, an equivalent circuit simulation was carried out, so as to determine electrostatic capacity, ESR value, and ESL value. Thus obtained results are shown in Table 2 which will follow. Table 2 is a table showing characteristics of four electrochemical elements (#1-A, #1-B, #1-C, #1-D) incorporated in the solid electrolytic capacitor #1.

TABLE 2

| Capacitor element | Electrostatic capacity | ESR | ESL |
|---|---|---|---|
| #1-A | 80.0 μF | 18 mΩ | 100 pH |
| #1-B | 88.0 μF | 15 mΩ | 120 pH |
| #1-C | 75.0 μF | 20 mΩ | 125 pH |
| #1-D | 84.0 μF | 13 mΩ | 90 pH |

Without being restricted by the above-mentioned embodiments, the present invention can be modified in various manners. For example, the number of capacitor elements disposed on the substrate is not limited to 4, but may be 2, 3, or 5 or more. The form of the capacitor element can be modified into various forms of multiterminal type elements as appropriate. Without being limited to aluminum, other valve metal supports may be used for the support of the capacitor elements. The through conduction path is not limited to the via hole, but may be a solid via filled with a metal conductor.

The above-mentioned capacitor element has a structure in which two sets of electrodes (each comprising an anode and a cathode) are drawn out from each of opposing two end parts of the storage part. However, for example, at least one set of electrodes may be drawn out from each of four end parts of a quadrangular capacitor element, or at least one set of electrodes may be drawn out from at least one end part of the capacitor element. When the capacitor element has such a structure, respective magnetic fields caused by currents flowing through electrode leads adjacent each other cancel each other out, whereby the solid electrolytic capacitor lowers its ESL.

In the above-mentioned embodiments, both end parts of a via hole are the first terminal (third terminal or fifth terminal) and the second terminal (fourth terminal) integrated with the via hole. However, the via hole, the first terminal, and the second terminal may be separated from each other.

The invention claimed is:

1. A solid electrolytic capacitor comprising:
   a substrate;
   a plurality of solid electrolytic capacitor elements arranged in a row on the substrate; and
   a pair of conduction paths, substantially parallel to each other, comprising an anode conduction path for connecting respective anodes of the solid electrolytic capacitor elements adjacent each other and a cathode conduction path for connecting respective cathodes of the adjacent solid electrolytic capacitor elements, the pair of conduction paths interposed between two adjacent solid electrolytic capacitor elements;
   wherein the anode conduction path and the cathode conduction path are electrically insulated from each other.

2. A solid electrolytic capacitor according to claim 1, wherein the conduction path pair is constituted by a lead pattern printed on one face of the substrate.

3. A solid electrolytic capacitor according to claim 1, further comprising a first terminal pair formed in the respective conduction paths of the conduction path pair, and a second terminal pair formed on the other face of the substrate so as to correspond to the first terminal pair;
   wherein the first and second terminal pairs are connected to each other by a through conduction path pair formed through the substrate in a thickness direction thereof.

4. A solid electrolytic capacitor according to claim 1, wherein the solid electrolytic capacitor element comprises a quadrangular storage part and respective anode electrode parts outwardly projecting from two sides of the storage part opposing each other; and
   wherein the anode electrode parts and the anode conduction path are electrically connected to each other.

5. A solid electrolytic capacitor according to claim 4, wherein the solid electrolytic capacitor elements adjacent each other are disposed on the substrate such that the respective anode electrode parts oppose each other.

6. A solid electrolytic capacitor comprising:
   a substrate including a third terminal pair adjacent each other formed on one face; a fourth terminal pair, disposed on the other face, corresponding to the third terminal pair; and through conduction paths, formed through the substrate in a thickness direction thereof, connecting the third and fourth terminal pairs to each other; and
   first and second solid electrolytic capacitor elements arranged in a row on the one face of the substrate;
   wherein an anode of the first solid electrolytic capacitor element is connected to one terminal of the third terminal pair, whereas a cathode of the second solid electrolytic capacitor element is connected to the other terminal of the third terminal pair.

7. A solid electrolytic capacitor according to claim 6, wherein the one face of the substrate is further formed with a pair of fifth terminals adjacent each other, a cathode of the first solid electrolytic capacitor element is connected to one terminal of the fifth terminal pair, and an anode of the second solid electrolytic capacitor element is connected to the other terminal of the fifth terminal pair.

8. A solid electrolytic capacitor according to claim 6, wherein the third terminal pair is positioned between the first and second solid electrolytic capacitor elements.

* * * * *